Figure 3:
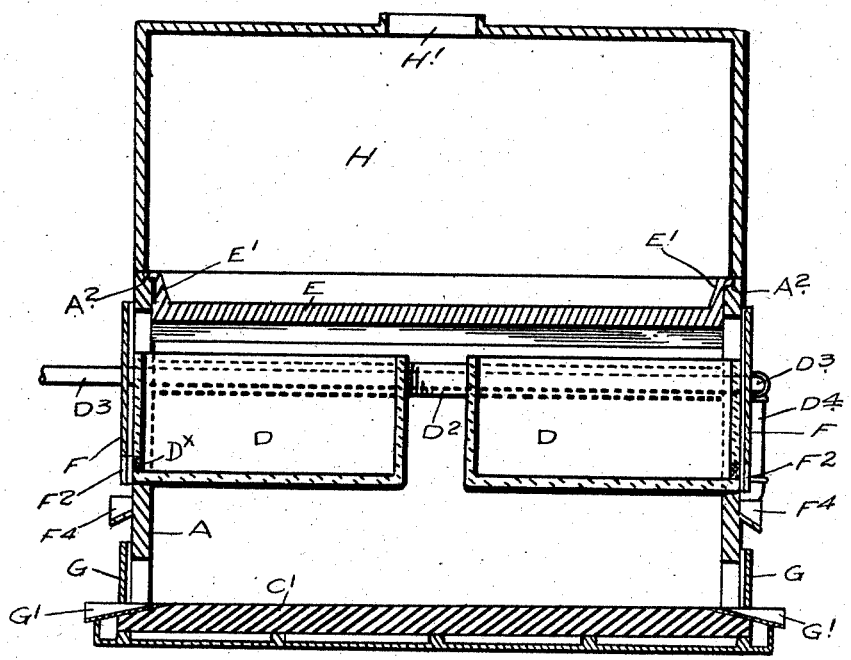

W. J. SHAW.
COMBINED REDUCTION AND CRUCIBLE FURNACE.
APPLICATION FILED SEPT. 25, 1909.
967,069.
Patented Aug. 9, 1910.
2 SHEETS—SHEET 1.
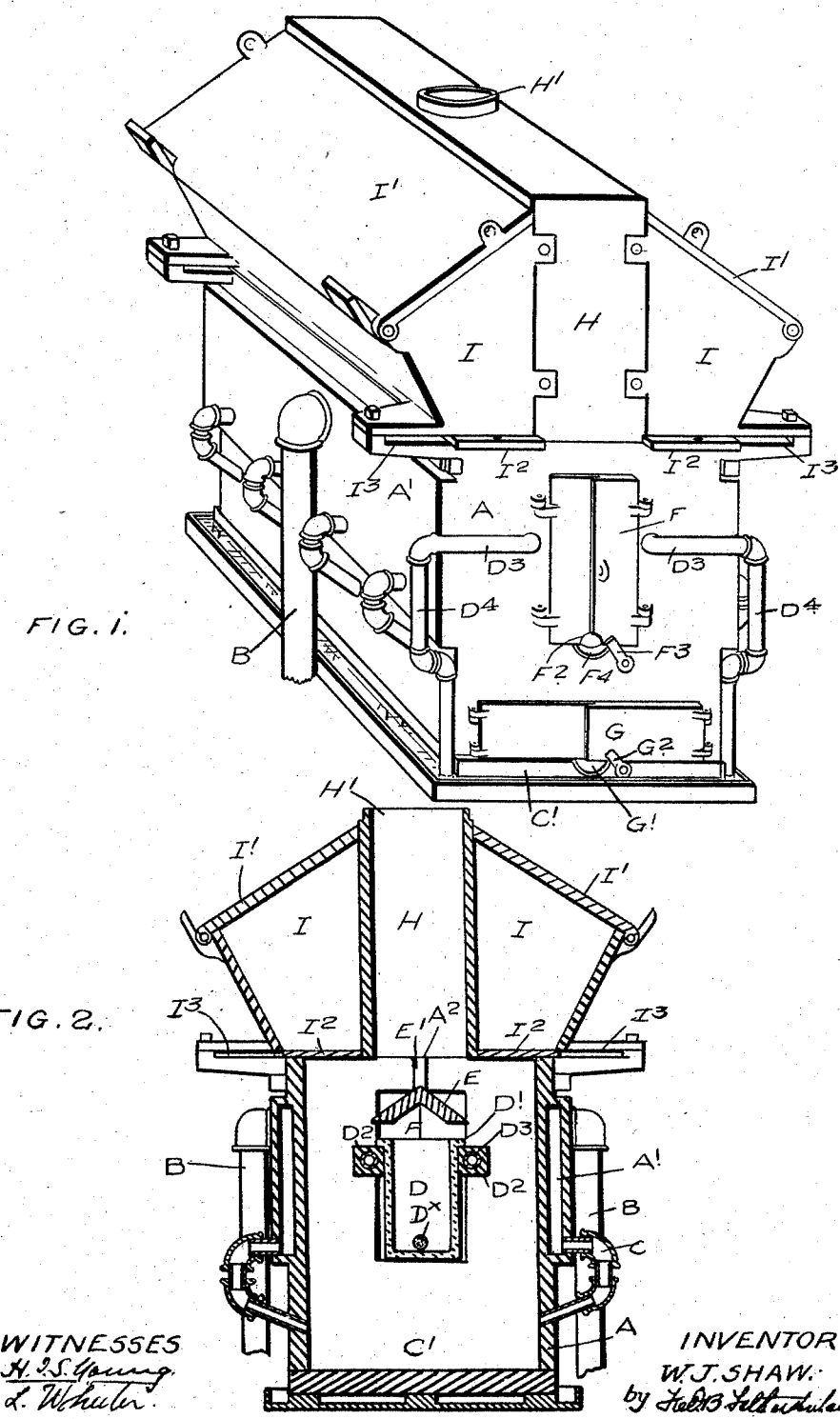

W. J. SHAW.
COMBINED REDUCTION AND CRUCIBLE FURNACE.
APPLICATION FILED SEPT. 25, 1909.

967,069.

Patented Aug. 9, 1910.

WITNESSES.

INVENTOR
W. J. SHAW.

UNITED STATES PATENT OFFICE.

WILLIAM JENKINS SHAW, OF TORONTO, ONTARIO, CANADA, ASSIGNOR, BY MESNE ASSIGNMENTS, TO INTERNATIONAL TOOL STEEL COMPANY, LIMITED, OF TORONTO, CANADA, A CORPORATION.

COMBINED REDUCTION AND CRUCIBLE FURNACE.

967,069.     Specification of Letters Patent.     Patented Aug. 9, 1910.

Application filed September 25, 1909. Serial No. 519,582.

*To all whom it may concern:*

Be it known that I, WILLIAM JENKINS SHAW, of the city of Toronto, in the county of York, in the Province of Ontario, Canada, have invented certain new and useful Improvements in Combined Reduction and Crucible Furnaces, of which the following is the specification.

My invention relates to improvements in combined reduction and crucible furnaces, and the object of the invention is to devise a simple and cheaply constructed furnace of this character particularly adaptable for the production of steel directly from metallic oxid sand or other pulverized iron ore in which the reduction of the ore and the melting of the metal resultant therefrom may be carried on simultaneously, and thereby effect an economy in the production of steel.

My invention consists of a furnace casing preferably rectangular in form and provided with a central top draft flue and side feeding hoppers on each side thereof provided with a hinged top and a slidable bottom, crucibles extending about midway of the length of the furnace to each end and provided with teem holes and end inclosing doors, a hood for the crucibles, water circulating pipes extending lengthwise through the furnace and designed to support the crucibles by flanges formed thereon, the parts being otherwise constructed and arranged in detail as hereinafter more particularly explained.

Figure 1, is a perspective view of a combined reduction and crucible furnace constructed in accordance with my invention. Fig. 2, is a vertical section. Fig. 3, is a longitudinal section.

In the drawings like letters of reference indicate corresponding parts in each figure.

A is the outer casing of the furnace, which is provided with a circumferential air chamber $A^1$ to which are connected the blast pipes B and from the bottom of which extend the twyers C into the bottom of the furnace above the hearth plate $C^1$.

D are crucibles preferably rectangular in form, which extend from about midway of the length of the furnace to each end being preferably formed of graphite and provided with side supporting flanges $D^1$, which rest on hollow bars $D^2$ rectangular in cross section and having water pipes $D^3$ running therethrough from end to end of the furnace. Such pipes D are provided with a circulation of water through a suitable medium and extend through the ends of the furnace being connected to the down pipes $D^4$. A constant circulation of cool water is kept up in these pipes and thereby the crucibles are supported without any danger of dropping or being fractured.

E is a right angled hood, which extends from end to end of the furnace, such hood being reverse broad V-shaped in cross section and supported by hooks $E^1$ extending into notches $A^2$ at the ends of the furnace walls.

Opposite the outer ends of the crucibles are doors F located in the end walls of the furnace and provided with suitable hinges and bottom notches $F^2$ opposite the teem hole $D^\times$ at the outer end of the bottom of the crucible. A suitable catch $F^3$ is provided to hold the doors closed. A sprout $F^4$ extends from the bottom of the notch $F^2$.

G are a pair of doors located at the end of the wall of the furnace above the level of the hearth C and provided underneath the same with a spout $G^1$, such doors overlapping where they meet and being held closed by a pivoted catch $G^2$.

H is a flue extending upwardly from the top of the furnace and provided with an orifice $H^1$ for the exit of the gases.

I are hoppers located on each side of the flue and provided with hinged tops $I^1$ and withdrawable bottoms $I^2$ sliding in guideways $I^3$ attached to or forming part of the casing.

Briquets, such as produced by the composition described in an application filed Sept. 25, 1909, Serial No. 519,583, are introduced into the top of the fuel bed at the bottom of the outer casing and the metal previously produced from a previous reduction is placed in the crucible. It will, of course, be understood that the fuel and briquets would be fed through the hoppers I and that when the upper doors $I^1$ are open for feeding the lower doors $I^2$ would be closed and when it is desired to deposit into the furnace any desired quantity the withdrawable bottoms or doors $I^2$ are withdrawn to any degree desired and the fuel and briquets will pass down into the furnace.

The hood E, of course, serves to protect the top of the crucibles and may be readily removed when it is desired.

Such a construction of furnace as I describe as will be understood from what has been hereinbefore premised combines the operations of the reduction of ore and the melting of the metal in the crucibles simultaneously from one bed of fuel. The crucibles are supported without any liability of their falling and the melted metal may be readily withdrawn from the teem holes of the crucibles when desired. The feeding of the fuel as well as the ore in briquets is provided for, so that there is no loss of heat and the metal in the furnace itself may be removed from the hearth as well as slag productions while the furnace is in operation from the end doors when open.

The metal is, of course, fed into the crucibles through the doors F when open.

What I claim as my invention is:

1. A furnace comprising a casing to contain the bed of fuel and means for suitably supporting a crucible within the casing intermediate the side walls in the bed of fuel and a fuel deflecting hood for the crucible having a central ridge, as and for the purpose specified.

2. A furnace comprising a suitable casing to contain the bed of fuel and means for supporting a crucible within the casing in the bed of fuel so that its ends abut the ends of the wall of the furnace and doors located opposite the crucible having their bottom abutting corners cut away as and for the purpose specified.

3. In a furnace, the combination with a casing to contain the bed of fuel, of means for supporting a crucible in the bed of fuel, said means comprising hollow bars and water circulation pipes extending through said bars and through the ends of the furnace as and for the purpose specified.

4. The combination with the furnace casing and means for supporting a crucible in the heating zone, of a hood reverse broad V-shaped in cross section and provided with end hooks supporting it above the crucible as and for the purpose specified.

5. The combination with a furnace casing provided with a suitable hearth of the end doors of the casing located above the level of the hearth for the passage of the bloom, and a suitable spout extending immediately underneath the doors whereby the slag underneath the metal may pass out as and for the purpose specified.

6. The combination with the casing and means for supporting a crucible therein within the heating zone, of a flue extending upwardly therefrom above the casing, the hood extending above the crucible, hoppers located at each side of the flue and provided with opening tops and bottoms as and for the purpose specified.

7. The combination with the casing and means for supporting a crucible therein within the heating zone, of a flue extending upwardly therefrom above the casing, the hood extending above the crucible, hoppers located at each side of the flue, hinged tops for the top of the hoppers and withdrawable bottoms for the bottoms of the hoppers located in suitable guide-ways as and for the purpose specified.

8. A reduction furnace and means for supporting a casing provided with an air chamber surrounding the same, pipes leading into the chamber and twyers leading from the bottom of the chamber into the interior of the furnace above the hearth or grate as and for the purpose specified.

WILLIAM JENKINS SHAW.

Witnesses:
B. BOYD,
R. COBAIN.